United States Patent
Nishizawa

(10) Patent No.: US 11,568,040 B2
(45) Date of Patent: Jan. 31, 2023

(54) MANAGEMENT APPARATUS AND NON-TRANSITORY COMPUTER READABLE MEDIUM FOR SETTING SECURITY LEVELS OF USERS IN GROUP RESULTING FROM UNIFICATION

(71) Applicant: FUJIFILM Business Innovation Corp., Tokyo (JP)

(72) Inventor: Takeshi Nishizawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 379 days.

(21) Appl. No.: 16/554,593

(22) Filed: Aug. 28, 2019

(65) Prior Publication Data

US 2020/0074071 A1    Mar. 5, 2020

(30) Foreign Application Priority Data

Sep. 5, 2018 (JP) .............................. JP2018-166056

(51) Int. Cl.
*G06F 21/45* (2013.01)
*G06F 21/31* (2013.01)
*G06F 21/78* (2013.01)

(52) U.S. Cl.
CPC ............ *G06F 21/45* (2013.01); *G06F 21/316* (2013.01); *G06F 21/78* (2013.01); *G06F 2221/2113* (2013.01)

(58) Field of Classification Search
CPC ................... G06F 21/604; G06F 21/45; G06F 2221/2113; G06F 2221/2141;

(Continued)

(56) References Cited

U.S. PATENT DOCUMENTS 6,606,706 B1 * 8/2003 Li .......................... H04L 63/062
                                                           713/153
7,716,140 B1 * 5/2010 Nielsen ................. H04L 67/306
                                                              726/21

(Continued)

FOREIGN PATENT DOCUMENTS

JP    2015204087    11/2015
JP    5910218       4/2016

OTHER PUBLICATIONS

AyacheM,GawanmehA,Al-KarakiJN.XBAC:AUnifiedAccessControlModelforHeterogeneousMulti-TenancyCloud Environments. In2019 15thInternationalWirelessCommunications&MobileComputingConference(IWCMC)Jun. 24, 2019(pp. 1872-1878).IEEE.*

(Continued)

*Primary Examiner* — Lizbeth Torres-Diaz
(74) *Attorney, Agent, or Firm* — JCIPRNET

(57) ABSTRACT

A management apparatus includes a memory, a unification policy setting unit, and a security level setting unit. The memory stores, for each of a user belonging to a first group and a user belonging to a second group, an authentication level of a domain assigned to a corresponding one of the users. The unification policy setting unit sets a unification policy that specifies a relationship between the authentication level and a security level for a state after unification. The security level setting unit sets the security level in a case where the first group and the second group undergo the unification into a third group. The security level is set for each of the users belonging to the third group by using the authentication level and the unification policy.

16 Claims, 16 Drawing Sheets

(58) Field of Classification Search
CPC ..... G06F 21/316; G06F 21/78; H04L 63/104; H04L 67/2852; H04L 63/105
See application file for complete search history.

(56) References Cited

U.S. PATENT DOCUMENTS

| | | | | |
|---|---|---|---|---|
| 8,612,466 | B2* | 12/2013 | Kikuchi | G06F 16/93 |
| | | | | 707/786 |
| 9,430,171 | B2* | 8/2016 | Iwase | G06F 3/1287 |
| 9,854,056 | B2* | 12/2017 | Kato | H04L 41/084 |
| 10,146,925 | B1* | 12/2018 | Rosenberg | G06V 40/172 |
| 2014/0337632 | A1* | 11/2014 | Kimura | H04L 63/0428 |
| | | | | 713/176 |
| 2015/0047056 | A1* | 2/2015 | Fabrikant | G06F 3/04847 |
| | | | | 726/28 |
| 2016/0055341 | A9* | 2/2016 | Sherrets | G06F 21/606 |
| | | | | 726/30 |
| 2019/0371442 | A1* | 12/2019 | Schoenberg | H04L 63/105 |
| 2020/0074071 | A1* | 3/2020 | Nishizawa | G06F 21/45 |

OTHER PUBLICATIONS

Office Action of Japan Counterpart Application, with English translation thereof, dated Jul. 5, 2022, pp. 1-3.

* cited by examiner

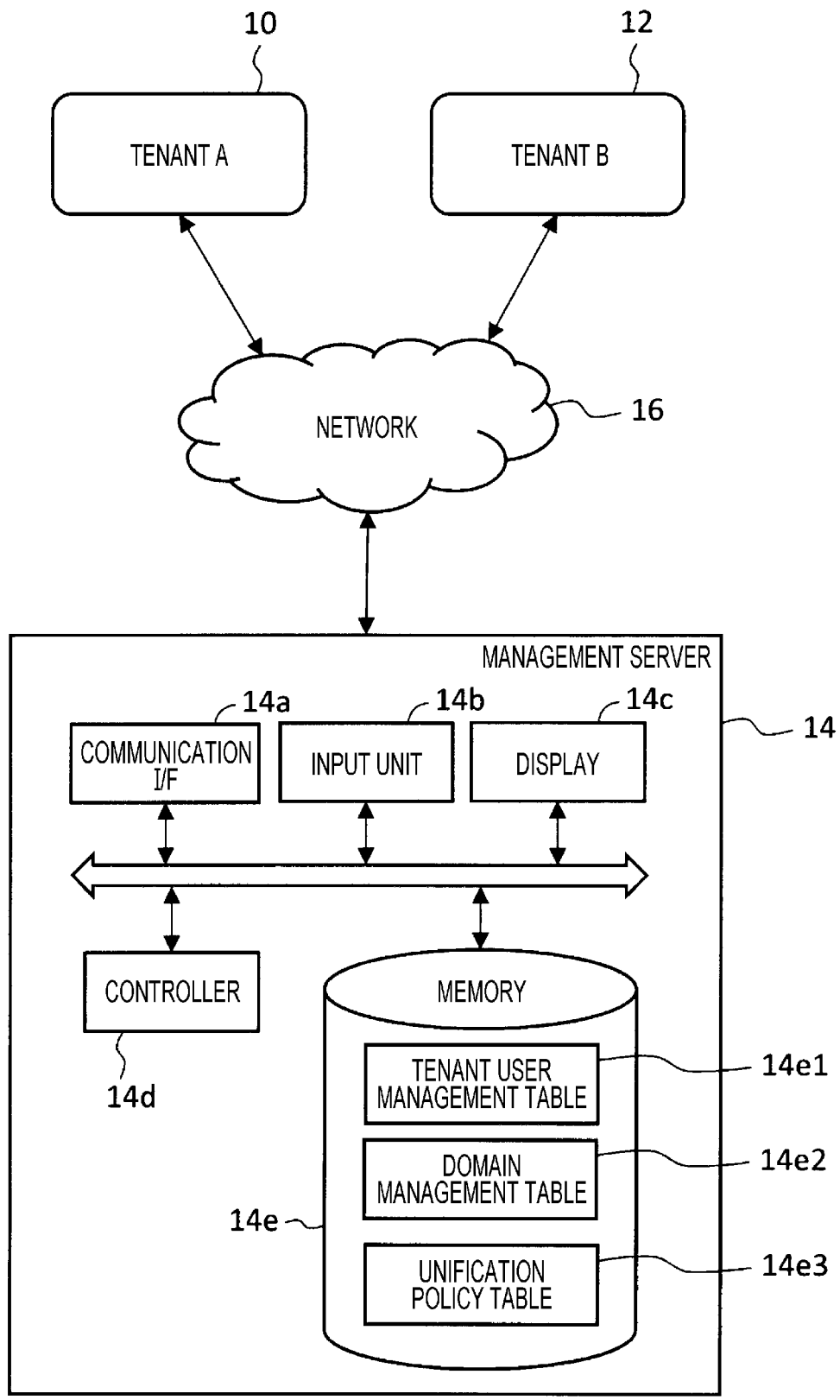

| TENANT ID | USER ID | SECURITY LEVEL | AUTHENTICATION DOMAIN |
|---|---|---|---|
| Tenant-A | u1@aaa.fujixerox.co.jp | AUTHENTICATED USER | aaa.fujixerox.co.jp |
| Tenant-A | u2@bbb.fujixerox.co.jp | AUTHENTICATED USER | bbb.fujixerox.co.jp |
| Tenant-A | u3@dom.example.com | GUEST | - |
| Tenant-B | u4@ccc.fujixerox.co.jp | AUTHENTICATED USER | ccc.fujixerox.co.jp |
| Tenant-B | u5@ddd.fujixerox.co.jp | AUTHENTICATED USER | ddd.fujixerox.co.jp |
| Tenant-B | u6@dom.example.com | GUEST | - |

| TENANT ID | DOMAIN | ONLINE VALIDATION | MANUAL VALIDATION | AUTHENTICATION LEVEL |
|---|---|---|---|---|
| Tenant-A | aaa.fujixerox.co.jp | DNS | VALIDATED | HIGH |
| Tenant-A | bbb.fujixerox.co.jp | UNAUTHENTICATED | VALIDATED | LOW |
| Tenant-B | ccc.fujixerox.co.jp | Web | VALIDATED | HIGH |
| Tenant-B | ddd.fujixerox.co.jp | DNS | UNVALIDATED | LOW |

FIG. 6

| ONLINE VALIDATION (DNS OR WEB) | MANUAL VALIDATION | DOMAIN AUTHENTICATION LEVEL | RELIABILITY OF USER BELONGING TO DOMAIN |
|---|---|---|---|
| VALIDATED | VALIDATED | HIGH | AUTHENTICATED USER |
| VALIDATED | UNVALIDATED | LOW | AUTHENTICATED USER |
| UNVALIDATED | VALIDATED | LOW | AUTHENTICATED USER |
| UNVALIDATED | UNVALIDATED | UNAUTHENTICATED | GUEST |

FIG. 7    14e3

| DOMAIN AUTHENTICATION LEVEL | POST-UNIFICATION SECURITY LEVEL |
|---|---|
| HIGH | AUTHENTICATED USER |
| LOW | GUEST |
| UNAUTHENTICATED | GUEST |

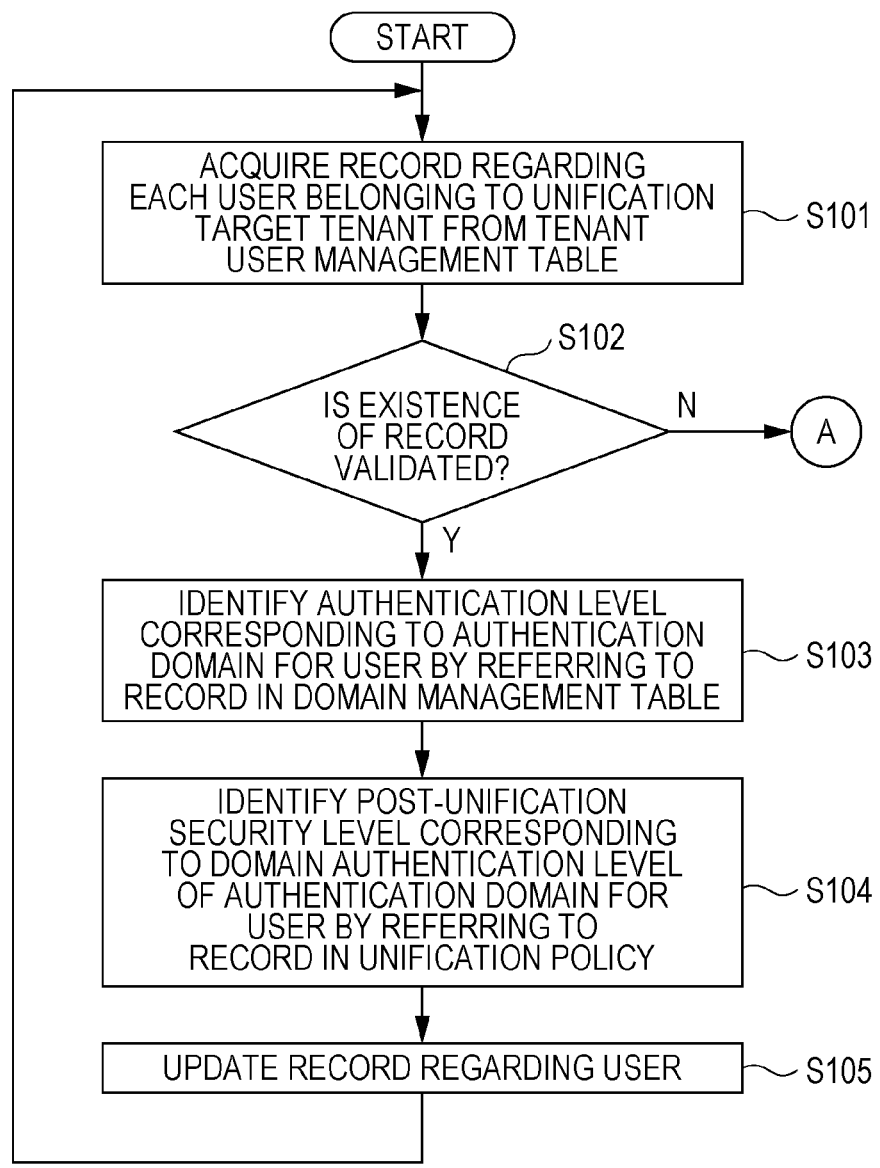

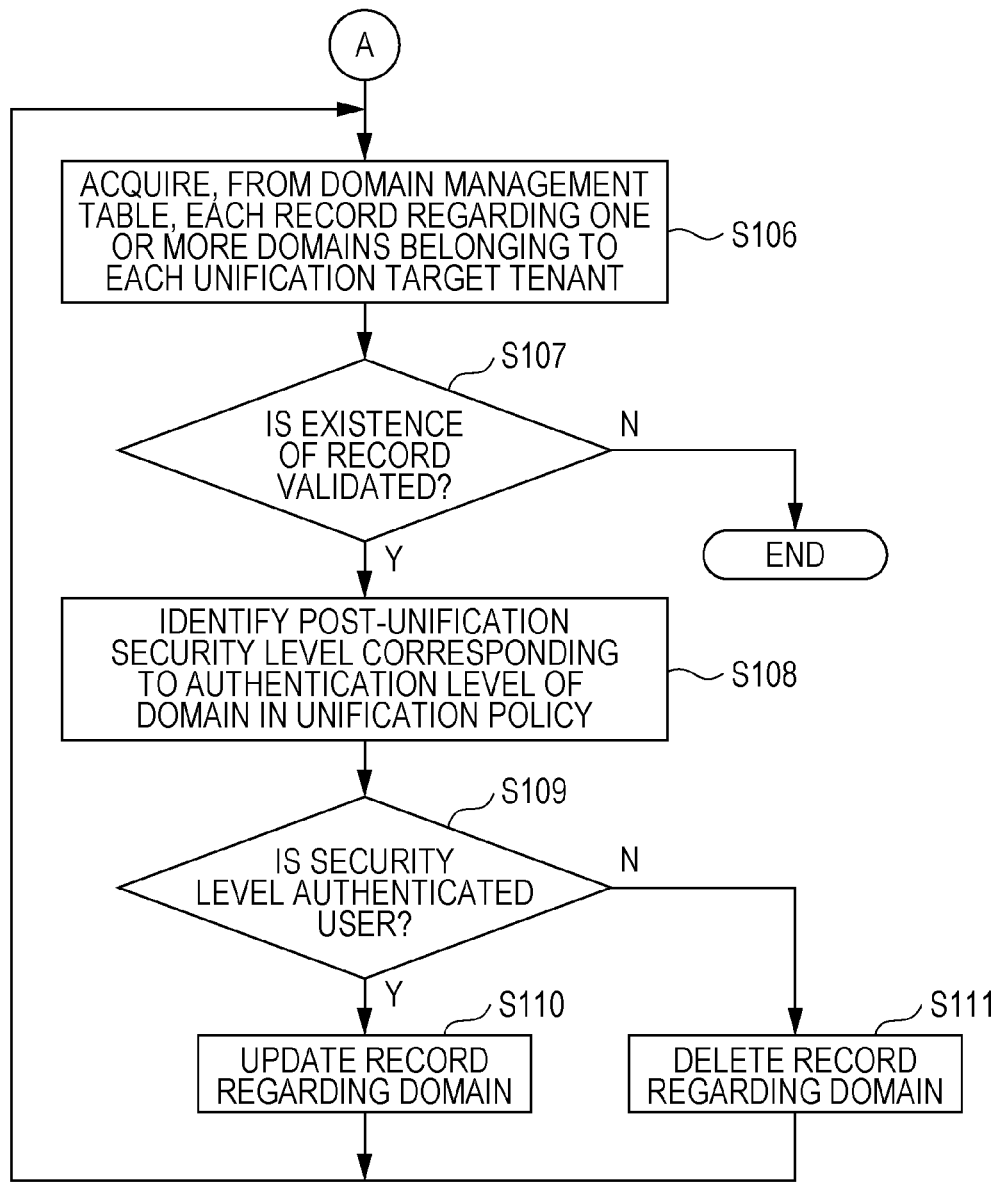

FIG. 9

| TENANT ID | USER ID | SECURITY LEVEL | AUTHENTICATION DOMAIN |
|---|---|---|---|
| Tenant-A | u1@aaa.fujixerox.co.jp | AUTHENTICATED USER | aaa.fujixerox.co.jp |
| Tenant-A | u2@bbb.fujixerox.co.jp | AUTHENTICATED USER | bbb.fujixerox.co.jp |
| Tenant-A | u3@dom.example.com | GUEST | - |
| Tenant-A | u4@ccc.fujixerox.co.jp | AUTHENTICATED USER | ccc.fujixerox.co.jp |
| Tenant-A | u5@ddd.fujixerox.co.jp | GUEST | - |
| Tenant-A | u6@dom.example.com | GUEST | - |

| TENANT ID | DOMAIN | ONLINE VALIDATION | MANUAL VALIDATION | AUTHENTICATION LEVEL |
|---|---|---|---|---|
| Tenant-A | aaa.fujixerox.co.jp | DNS | VALIDATED | HIGH |
| Tenant-A | bbb.fujixerox.co.jp | UNAUTHENTICATED | VALIDATED | LOW |
| Tenant-A | ccc.fujixerox.co.jp | Web | VALIDATED | HIGH |
| Tenant-B | ddd.fujixerox.co.jp | DNS | UNVALIDATED | LOW |

| DOMAIN AUTHENTICATION LEVEL | POST-UNIFICATION SECURITY LEVEL |
|---|---|
| HIGH | AUTHENTICATED USER |
| LOW | AUTHENTICATED USER |
| UNAUTHENTICATED | GUEST |

| DOMAIN AUTHENTICATION LEVEL | POST-UNIFICATION SECURITY LEVEL |
|---|---|
| HIGH | GUEST |
| LOW | GUEST |
| UNAUTHENTICATED | GUEST |

| TENANT ID | SERVICE ID | USER ID |
|---|---|---|
| Tenant-A | Service-A | u1@aaa.fujixerox.co.jp |
| Tenant-A | Service-A | u2@bbb.fujixerox.co.jp |
| Tenant-B | Service-B | u4@ccc.fujixerox.co.jp |
| Tenant-B | Service-B | u5@ddd.fujixerox.co.jp |

| TENANT ID | SERVICE ID | THE NUMBER OF LICENSES | THE NUMBER OF ASSIGNED LICENSES |
|---|---|---|---|
| Tenant-A | Service-A | 100 | 2 |
| Tenant-B | Service-B | 100 | 2 |

| TENANT ID | SERVICE ID | PRE-UNIFICATION TENANT ID OF USER | POST-UNIFICATION SECURITY LEVEL | LICENSE |
|---|---|---|---|---|
| Tenant-A | Service-A | Tenant-B | AUTHENTICATED USER | NOT ASSIGN |
| Tenant-A | Service-A | Tenant-B | GUEST | NOT ASSIGN |
| Tenant-A | Service-B | Tenant-A | AUTHENTICATED USER | ASSIGN |
| Tenant-A | Service-B | Tenant-A | GUEST | NOT ASSIGN |
| Tenant-A | Service-B | Tenant-B | AUTHENTICATED USER | ASSIGN |
| Tenant-A | Service-B | Tenant-B | GUEST | NOT ASSIGN |

| TENANT ID | SERVICE ID | USER ID |
|---|---|---|
| Tenant-A | Service-A | u1@aaa.fujixerox.co.jp |
| Tenant-A | Service-A | u2@bbb.fujixerox.co.jp |
| Tenant-B | Service-B | u4@ccc.fujixerox.co.jp |
| Tenant-B | Service-B | u5@ddd.fujixerox.co.jp |
| Tenant-A | Service-B | u1@aaa.fujixerox.co.jp |
| Tenant-A | Service-B | u2@bbb.fujixerox.co.jp |

| TENANT ID | SERVICE ID | THE NUMBER OF LICENSES | THE NUMBER OF ASSIGNED LICENSES |
|---|---|---|---|
| Tenant-A | Service-A | 100 | 2 |
| Tenant-A | Service-B | 100 | 2 |

FIG. 20

| TENANT ID | SERVICE ID | USER ID | CLASSIFICATION |
|---|---|---|---|
| Tenant-B | Service-B | u4@ccc.fujixerox.co.jp | ADMINISTRATOR |
| Tenant-B | Service-B | u5@ddd.fujixerox.co.jp | ADMINISTRATOR |
| Tenant-B | Service-B | u6@dom.example.com | GENERAL |

| TENANT ID | SERVICE ID | THE NUMBER OF LICENSES | THE NUMBER OF ASSIGNED LICENSES |
|---|---|---|---|
| Tenant-B | Service-B | 100 | 3 |

| TENANT ID | SERVICE ID | PRE-UNIFICATION TENANT ID OF USER | POST-UNIFICATION SECURITY LEVEL | LICENSE | CLASSIFICATION |
|---|---|---|---|---|---|
| Tenant-A | Service-B | Tenant-A | AUTHENTICATED USER | ASSIGN | ADMINISTRATOR |
| Tenant-A | Service-B | Tenant-A | GUEST | NOT ASSIGN | - |
| Tenant-A | Service-B | Tenant-B | AUTHENTICATED USER | ASSIGN | GENERAL |
| Tenant-A | Service-B | Tenant-B | GUEST | NOT ASSIGN | - |

| TENANT ID | SERVICE ID | USER ID | CLASSIFICATION |
|---|---|---|---|
| Tenant-A | Service-B | u4@cccc.fujixerox.co.jp | GENERAL |
| Tenant-A | Service-B | u5@ddd.fujixerox.co.jp | GENERAL |
| Tenant-B | Service-B | ~~u6@domr.example.com~~ | ~~GENERAL~~ |
| Tenant-A | Service-B | u1@aaa.fujixerox.co.jp | ADMINISTRATOR |
| Tenant-A | Service-B | u2@bbb.fujixerox.co.jp | ADMINISTRATOR |

FIG. 24

| TENANT ID | SERVICE ID | THE NUMBER OF LICENSES | THE NUMBER OF ASSIGNED LICENSES |
|---|---|---|---|
| Tenant-A | Service-B | 100 | 4 |

| | DOMAIN AUTHENTICATION LEVEL: HIGH | DOMAIN AUTHENTICATION LEVEL: LOW | DOMAIN AUTHENTICATION LEVEL: UNAUTHENTICATED |
|---|---|---|---|
| USE FREQUENCY: HIGH | AUTHENTICATED USER | AUTHENTICATED USER | GUEST |
| USE FREQUENCY: LOW | AUTHENTICATED USER | GUEST | GUEST |

14e3

MANAGEMENT APPARATUS AND NON-TRANSITORY COMPUTER READABLE MEDIUM FOR SETTING SECURITY LEVELS OF USERS IN GROUP RESULTING FROM UNIFICATION

CROSS-REFERENCE TO RELATED APPLICATIONS

This application is based on and claims priority under 35 USC 119 from Japanese Patent Application No. 2018-166056 filed Sep. 5, 2018.

BACKGROUND

(i) Technical Field

The present disclosure relates to a management apparatus and a non-transitory computer readable medium.

(ii) Related Art

A multitenant service is known in cloud services. In the multitenant service, a service is provided on the basis of multiple tenants (a unit for managing users who use cloud services is a group).

Japanese Patent No. 5910218 describes technology for reducing labor in system conversion in unifying or dividing tenants in a system providing a multitenant service. A management apparatus including a user information management unit, a device information management unit, a first determination unit, a second determination unit, and a controller is described. The user information management unit manages information about groups of users in association with pieces of user identification information identifying the respective users. The device information management unit manages information regarding two groups that are a main group and a sub group on a per device basis in association with at least one device. The device belongs to the main group, and the sub group is different from the main group but is permitted to use the device. When a request for the use of the device is received from an information terminal, the first determination unit determines whether the group of the user operating the information terminal matches the main group for the device related to the use request. If the first determination unit determines that the group does not match the main group, the second determination unit determines whether the group of the user operating the information terminal matches a group included in the sub group for the device related to the use request. The controller controls the use of the device related to the use request, depending on whether the first determination unit or the second determination unit determines that the group managed by the user information management unit in association with the user identification information regarding the user operating the information terminal is included in the main group or the sub group managed by the device information management unit in association with the device related to the use request.

SUMMARY

Aspects of non-limiting embodiments of the present disclosure relate to a management apparatus and a non-transitory computer readable medium.

Assume a case where groups (tenants) are unified into one group, and where users registered in the groups yet to be unified are automatically registered in the group resulting from the unification. If a user with a low security level is set as a unification target without taking the security level thereof into consideration, it is possible that security trouble occurs. Although it is conceivable that the security levels of the users are changed on a per user basis after the unification, the burden in changing the settings is increased with the increase of the number of users.

It is an object of the present disclosure to reduce the burden in changing settings after unification of groups (tenants) and to ensure the security in a group resulting from the unification.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a management apparatus including a memory, a unification policy setting unit, and a security level setting unit. The memory stores, for each of a user belonging to a first group and a user belonging to a second group, an authentication level of a domain assigned to a corresponding one of the users. The unification policy setting unit sets a unification policy that specifies a relationship between the authentication level and a security level for a state after unification. The security level setting unit sets the security level in a case where the first group and the second group undergo the unification into a third group. The security level is set for each of the users belonging to the third group by using the authentication level and the unification policy.

BRIEF DESCRIPTION OF THE DRAWINGS

An exemplary embodiment of the present disclosure will be described in detail based on the following figures, wherein:

FIG. 1 is a diagram of the configuration of a system in an exemplary embodiment;

FIG. 3 is an explanatory table of a tenant user management table in the exemplary embodiment;

FIG. 4 is an explanatory table of a domain management table in the exemplary embodiment;

FIG. 6 is an explanatory table of domain authentication levels in the exemplary embodiment;

FIG. 7 is an explanatory table of a unification policy table in the exemplary embodiment;

FIG. 8A is a processing flowchart (No. 1) in the exemplary embodiment;

FIG. 8B is the processing flowchart (No. 2) in the exemplary embodiment;

FIG. 9 is an explanatory table of the updated tenant user management table in the exemplary embodiment;

FIG. 10 is an explanatory table of the updated domain management table in the exemplary embodiment;

FIG. 12 is an explanatory table of a different unification policy table in the exemplary embodiment;

FIG. 13 is an explanatory table of a different unification policy table in the exemplary embodiment;

FIG. 14 is an explanatory table of a different tenant user management table in the exemplary embodiment;

FIG. 15 is an explanatory table of a service management table in the exemplary embodiment;

FIG. 16 is an explanatory table of a different unification policy table in the exemplary embodiment;

FIG. 18 is an explanatory table of the updated different tenant user management table in the exemplary embodiment;

FIG. 19 is an explanatory table of the updated service management table in the exemplary embodiment;

FIG. 20 is an explanatory table of a different tenant user management table in the exemplary embodiment;

FIG. 21 is an explanatory table of a different service management table in the exemplary embodiment;

FIG. 22 is an explanatory table of a different unification policy table in the exemplary embodiment;

FIG. 23 is an explanatory table of the updated different tenant user management table in the exemplary embodiment;

FIG. 24 is an explanatory table of the updated different service management table in the exemplary embodiment; and FIG. 25 is an explanatory table of a unification policy table in a modification.

DETAILED DESCRIPTION

Figure 2A:
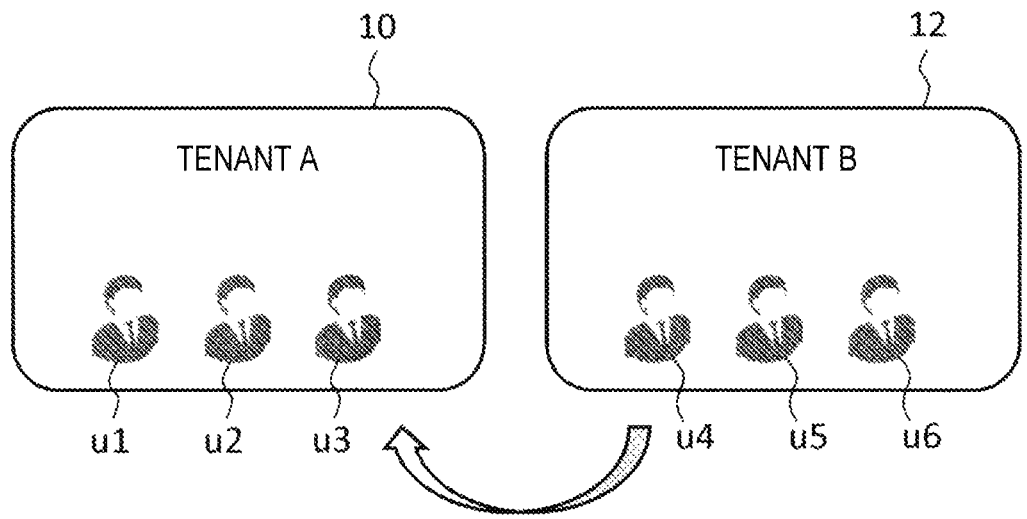
FIG. 2A is an explanatory diagram of tenants before unification (pre-unification tenants) in the exemplary embodiment.

Hereinafter, an exemplary embodiment of the present disclosure will be described on the basis of the drawings.

FIG. 1 illustrates the configuration of a system in this exemplary embodiment. The system includes multiple tenants each of which is a unit of users who use a cloud service and includes a tenant A 10 and a tenant B 12 in FIG. 1. The tenant A 10 and the tenant B 12 are connected to a network 16 such as the Internet. On the opposite side, a management server 14 is connected to the network 16. The management server 14 controls operation in the tenant A 10 and the tenant B 12. Specifically, each of the tenant A 10 and the tenant B 12 includes an information terminal and a device. The management server 14 processes a request from the information terminal and controls the operation of the device of the tenant.

The management server 14 is a server computer that manages information regarding the devices included in the tenant A 10 and the tenant B 12, that receives a request received from the information terminal to use a device included in the tenant A 10 or the tenant B 12, and that controls the use of the device on the basis of the request. The management server 14 includes, as functional blocks, a communication interface (I/F) 14a, an input unit 14b, a display 14c, a controller 14d, and a memory 14e.

The communication I/F 14a receives the request from the tenant A 10 or B 12 via the network 16, processes the request, and outputs the result to the tenant A 10 or B 12 via the network 16.

The input unit 14b functions as a unification policy setting unit and inputs, through operation by an administrator, a unification policy that is a rule for a process to be executed in unifying the tenant A 10 and the tenant B 12.

The display 14c displays the input unification policy and the like.

The memory 14e stores a tenant user management table 14e1, a domain management table 14e2, and a unification policy table 14e3.

The controller 14d functions as a security level setting unit and controls the security levels of the users of the tenant A 10 and the users of the tenant B 12 in a case where the tenant A 10 and the tenant B 12 are unified into one. Specifically, the controller 14d refers to the tenant user management table 14e1, the domain management table 14e2, and the unification policy table 14e3 stored in the memory 14e and thereby sets the security level of each user belonging to the corresponding unification target tenant. Assume a case where the tenant A 10 and the tenant B 12 are unified into one, for example, where the unification is performed in such a manner that the tenant A 10 absorbs the tenant B 12, and where the users registered in the pre-unification tenant B 12 are automatically registered in the post-unification tenant A 10. If a user with a low security level is set as a unification target without taking into consideration the security levels of the users previously belonging to the pre-unification tenant B 12, it is possible that security trouble occurs. If the security levels are changed on a per user basis after the unification, the burden in changing the settings is increased with the increase of the number of users.

In this exemplary embodiment, the handling of the security levels of the users belonging to the tenant B 12 is specified consistently by using the unification policy. The controller 14d refers to the unification policy and thereby adaptively sets the security levels, in the post-unification tenant, of the users belonging to the tenant B 12 as the unification target.

The management server 14 has a configuration of a server computer, that is, includes one or more processors, a ROM, a RAM, various interfaces, input devices such as a keyboard and a mouse, an image output device such as a display, and a memory device such as a hard disk drive (HDD) or a solid state drive (SDD). The one or more processors read out and run a processing program stored in the ROM or the memory device and thereby implement the controller 14d. The input devices such as the keyboard implement the input unit 14b, the image output device such as the display implements the display 14c, and the memory device such as the HDD implements the memory 14e. Processes executed by the one or more processors by running the processing program are exemplified as follows.

The tenant user management table 14e1 is generated and stored in the memory 14e.

The domain management table 14e2 is generated and is stored in the memory 14e.

The unification policy table 14e3 is generated by using the unification policy received from the input unit 14b and is stored in the memory 14e.

In the case where the tenants are unified, the security levels of the users belonging to the post-unification tenant are set by using the tenant user management table 14e1, the domain management table 14e2, and the unification policy table 14e3.

The tenant user management table 14e1 and the domain management table 14e2 are updated for the post-unification tenant and are stored in the memory 14e.

Figure 2B:
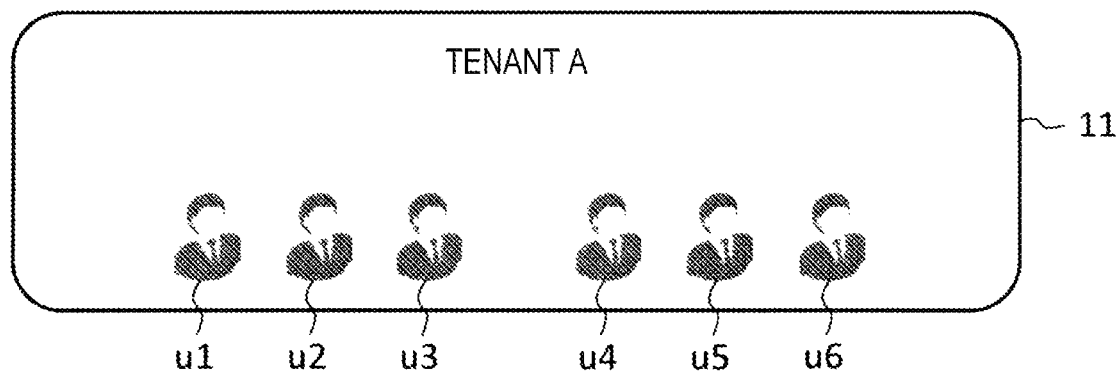
FIG. 2B is an explanatory diagram of a tenant after the unification (post-unification tenant) in the exemplary embodiment.

FIGS. 2A and 2B schematically illustrate the process executed by the management server 14.

A user u1, a user u2, and a user u3
are present as users belonging to the tenant A 10. The following domains are present as the domains of the tenant A 10.
aaa.fujixerox.co.jp
bbb.fujixerox.co.jp The authentication levels of the domains are as follows.
aaa.fujixerox.co.jp: High
bbb.fujixerox.co.jp: Low The users belong to the respective domains, for example, as follows.
User u1: u1@aaa.fujixerox.co.jp
User u2: u2@bbb.fujixerox.co.jp
User u3: u3@dom.example.com In this case, the user u1 is an authenticated user with a high authentication level, the user u2 is an authenticated user with a low authentication level, and the user u3 is a guest associated with an unauthenticated domain.

In contrast, a user u4, a user u5, and a user u6
are present as users belonging to the tenant B 12. The following domains are present as the domains of the tenant B 12.
ccc.fujixerox.co.jp
ddd.fujixerox.co.jp The authentication levels of the domains are as follows.
ccc.fujixerox.co.jp: High
ddd.fujixerox.co.jp: Low The users belong to the respective domains, for example, as follows.
User u4: u4@ccc.fujixerox.co.jp
User u5: u5@ddd.fujixerox.co.jp
User u6: u6@dom.example.com In this case, the user u4 is an authenticated user with the high authentication level, the user u5 is an authenticated user with the low authentication level, and the user u6 is a guest associated with an unauthenticated domain.

If the tenant A 10 and the tenant B 12 are unified into one, for example, if the unification is performed in such a manner that the tenant A 10 absorbs the tenant B 12, only a post-unification tenant A 11 is present as a tenant as illustrated in FIG. 2B.

The user u1, the user u2, the user u3, the user u4, the user u5, and the user u6
belong to the post-unification tenant A 11. Since the users u1, u2, and u3 originally belong to the tenant A 10, the security levels may be kept as before also in the post-unification tenant A 11. However, there arises an issue of how the security levels of the users u4, u5, and u6 previously belonging to the tenant B 12 as the unification target are set in the post-unification tenant A 11. For example, the user u5 is an authenticated user but has a low authentication level. Accordingly, if the user u5 is permitted as the authenticated user in the post-unification tenant A 11 as before, it is possible that security trouble occurs.

In the case as described above, the controller 14d of the management server 14 refers to the tenant user management table 14e1, the domain management table 14e2, and the unification policy table 14e3 and thereby sets the security levels of the users previously belonging to the tenant B 12 as the unification target on the basis of the authentication levels for the respective users in accordance with the unification policy specified in the unification policy table 14e3 (or a unification rule).

FIG. 3 illustrates an example of the tenant user management table 14e1. The tenant user management table 14e1 manages the user ID, the security level, and the authentication domain for each user belonging to the corresponding tenant. For the tenant A 10, for example, the following are registered. The user IDs are as follows.
u1@aaa.fujixerox.co.jp
u2@bbb.fujixerox.co.jp
u3@dom.example.com The security levels and the authentication domains thereof are as follows.
Security level of u1@aaa.fujixerox.co.jp: Authenticated user
Authentication domain for u1@aaa.fujixerox.co.jp: aaa.fujixerox.co.jp
Security level of u2@bbb.fujixerox.co.jp: Authenticated user
Authentication domain for u2@bbb.fujixerox.co.jp: bbb.fujixerox.co.jp
Security level of u3@dom.example.com: Guest
Authentication domain for u3@dom.example.com: Nil For the tenant B 12, the following are registered. The user IDs are as follows.
u4@aaa.fujixerox.co.jp
u5@bbb.fujixerox.co.jp
u6@dom.example.com The security levels and the authentication domains are as follows.
Security level of u4@ccc.fujixerox.co.jp: Authenticated user
Authentication domain for u4@ccc.fujixerox.co.jp: ccc.fujixerox.co.jp
Security level of u5@ddd.fujixerox.co.jp: Authenticated user
Authentication domain for u5@ddd.fujixerox.co.jp: ddd.fujixerox.co.jp
Security level of u6@dom.example.com: Guest
Authentication domain for u6@dom.example.com: Nil Referring to the tenant user management table 14e1 enables the security level and the authentication domain for each user belonging to a tenant to be uniquely identified.

FIG. 4 illustrates an example of the domain management table 14e2. The domain management table 14e2 manages the authentication domains for the tenants. For example, for the tenant A 10, the following are registered. The authentication domains are as follows.
aaa.fujixerox.co.jp
bbb.fujixerox.co.jp Authentication methods for the authentication domains and the authentication levels thereof are as follows.
Authentication method for aaa.fujixerox.co.jp: domain name system (DNS) in Online validation and Validated in Manual validation
Authentication level of aaa.fujixerox.co.jp: High
Authentication method for bbb.fujixerox.co.jp:
Unauthenticated in Online validation and Validated in Manual validation
Authentication level of bbb.fujixerox.co.jp: Low For the tenant B 12, the following are registered. The authentication domains are as follows.
ccc.fujixerox.co.jp
ddd.fujixerox.co.jp The authentication methods for the authentication domains and the authentication levels are as follows.
Authentication method for ccc.fujixerox.co.jp: Web in the online validation and Validated in Manual validation
Authentication level of ccc.fujixerox.co.jp: High
Authentication method for ddd.fujixerox.co.jp: DNS in Online validation and Unvalidated in Manual validation
Authentication level of ddd.fujixerox.co.jp: Low The authentication level is determined on the basis of the validation level of the online validation and the manual validation. Specifically, if a domain is doubly validated in the online validation and the manual validation, the authentication level is determined to be high. If the domain is validated in one of the online validation and the manual validation, the authentication level is determined to be low. Accordingly, for example, aaa.fujixerox.co.jp that is an authentication domain is doubly validated in the online validation and the manual validation, and thus the authentication level is determined to be high.

The authentication of the domain, that is, validation of the existence thereof will be described as below.

Methods for validating the existence of an organization that is a tenant operation base and the domain thereof include online validation using a public repository allowed to be set actually by only an administrator of the domain. The methods also include manually validating the content of the registration of a register or a third party database and directly validating the existence of the administrator by telephone.

Figure 5:
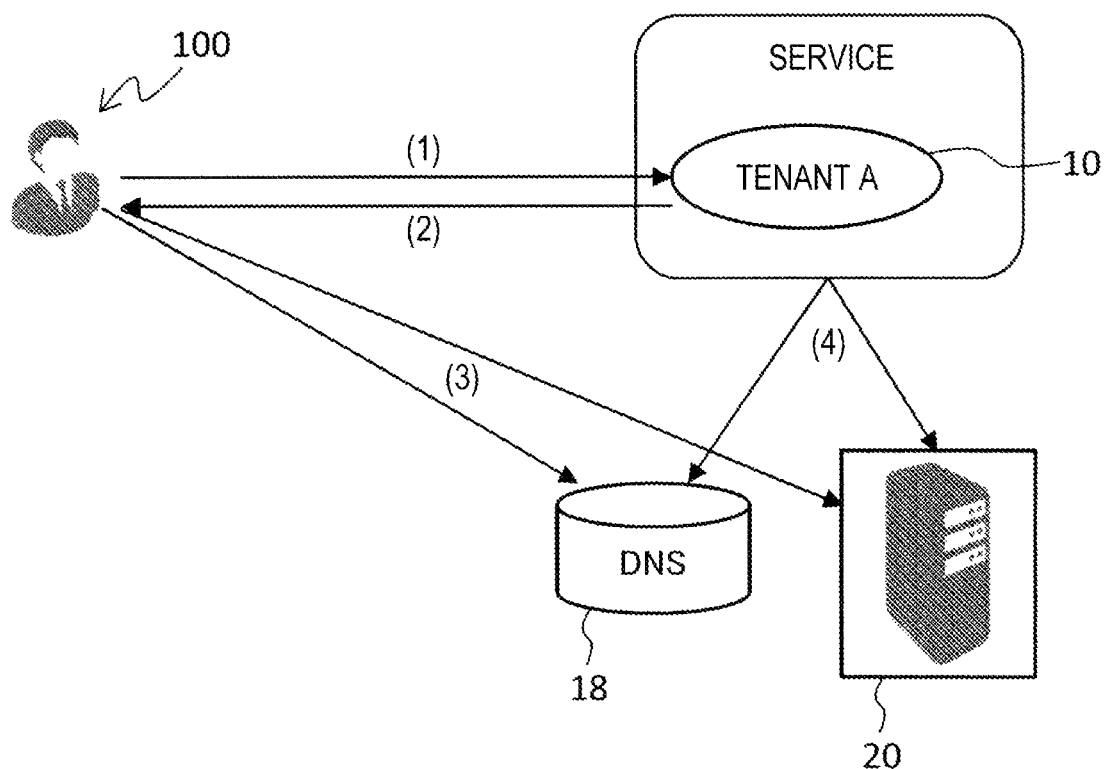
FIG. 5 is a schematic diagram of online validation of the existence of a domain in the exemplary embodiment.

FIG. 5 schematically illustrates an online existence validation method.

First Step

An administrator 100 requests the tenant A 10 via a network to validate the owner of the domain aaa.fujixerox.co.jp.

Second Step

The tenant A 10 returns a challenge code in response to the request. For example, the tenant A 10 returns "challenge-201800023" as the challenge code.

Third Step

The administrator 100 registers the challenge code acquired from the tenant A 10 in a corresponding one of name spaces in the public repository. For example, the administrator 100 registers aaa.fujixerox.co.jp IN TXT "challenge-201800023" in a DNS 18 or http:www.aaa.fujixerox.co.jp/index.html <meta challenge -201800023" in a Web 20.

Fourth Step

The existence is validated by validating the challenge code registered in the public repository. Specifically, the DNS 18 or the Web 20 is accessed to validate the challenge code, and thereby the existence of the tenant A 10 is validated.

FIG. 6 illustrates domain authentication levels based on the combination of the online validation and the manual validation. As described above, High is set for Authentication level if a domain is doubly validated in the online validation and the manual validation, and Low is set for Authentication level if the domain is validated in one of the online validation and the manual validation. Note that if the domain is not validated in any of the online validation and the manual validation, Unauthenticated is set for Authentication level. The security level (reliability) of a user is determined on the basis of the authentication level of the domain to which the user belongs. Specifically, High as Domain authentication level leads to Authenticated user, Low as Domain authentication level leads to Authenticated user, and Unauthenticated as Domain authentication level leads to Guest.

FIG. 7 illustrates an example of the unification policy table 14e3. The unification policy table 14e3 specifies the rule for how the security levels of users are set in the case where the tenant A 10 and the tenant B 12 are unified. Specifically, the unification policy table 14e3 specifies a relationship between the authentication level after the unification (pre-unification authentication level) of a domain to which a user belongs and the security level after the unification (post-unification security level) of the user. For example, High as Domain authentication level leads to Authenticated user, Low as Domain authentication level leads to Guest, and Unauthenticated as Domain authentication level leads to Guest. Note that in FIG. 6, Low as Domain authentication level leads to Authenticated user, and in contrast in FIG. 7, Low as Domain authentication level leads to Guest. This means that when the authentication level for a user belonging to a tenant as a unification target is relatively low, the authentication level is not kept in the post-unification tenant, and the user is handled as a guest substantially corresponding to the Unauthenticated level.

FIG. 8A illustrates a processing flowchart in this exemplary embodiment. FIG. 8A illustrates the process executed by the controller 14d of the management server 14 and the case where the unification is performed in such a manner that the tenant A 10 absorbs the tenant B 12.

In the case where the tenant A 10 and the tenant B 12 are unified, the controller 14d accesses the tenant user management table 14e1 stored in the memory 14e and acquires a record regarding each user belonging to a unification target tenant (S101). Specifically, the unification target tenant is the tenant B 12, and the following records are acquired as the records regarding the users belonging to the tenant B 12.

u4@ccc.fujixerox.co.jp: Authenticated user as Security level; and ccc.fujixerox.co.jp as Authentication domain u5@ddd.fujixerox.co.jp: Authenticated user as Security level; and ddd.fujixerox.co.jp as Authentication domain u6@dom.example.com: Guest as Security level; and Nil as Authentication domain The controller 14d determines whether the existence of the record is validated (S102). If the existence of the user belonging to the tenant as the unification target is not validated, and if the existence of the record is not validated, either (NO in S102), the process moves to the process in FIG. 8B.

In contrast, if the existence of the record is validated (YES in S102), the controller 14d identifies the authentication domain for the user by referring to the acquired record and identifies the authentication level corresponding to the authentication domain by further referring to the domain management table 14e2 (S103).

The controller 14d refers to the unification policy table 14e3 and thereby identifies the post-unification security level corresponding to the authentication level of the authentication domain for the user (S104).

After identifying the security level, the controller 14d updates the record regarding the user with the identified security level (S105). Specifically, the controller 14d updates the tenant ID, the security level, and the authentication domain for the user in the tenant user management table 14e1. Since the tenant B 12 disappears due to the unification, the controller 14d deletes the tenant B 12 in the domain management table 14e2.

How the tenant user management table 14e1, the domain management table 14e2, and the unification policy table 14e3 are referred to is summarized as follows.

(1) The user ID and the authentication domain for each user in the unification target are identified by referring to the tenant user management table 14e1.
(2) The authentication level of the authentication domain for the user is identified by referring to the domain management table 14e2.
(3) The post-unification security level of the user is identified by referring to the unification policy table 14e3.
(4) The tenant user management table 14e1 and the domain management table 14e2 are updated by using the identified security level of the user.

FIG. 8B is a processing flowchart for the case where the existence of the record regarding the user belonging to the tenant B 12 as the unification target tenant in the tenant user management table 14e1 is not validated (NO in S102).

The controller 14d refers to the domain management table 14e2 and thereby acquires each record regarding one or more domains belonging to the unification target tenant (S106). Specifically, the following domains are present as domains belonging to the tenant B 12 as the unification target tenant.
ccc.fujixerox.co.jp
ddd.fujixerox.co.jp
Accordingly, the controller 14d acquires records regarding these domains. The controller 14d determines whether the existence of each record is validated (S107). If the existence of the record is not validated, the process is terminated.

If the existence of the record is validated (YES in S107), the controller 14d refers to the unification policy table 14e3 and identifies the post-unification security level corresponding to the authentication level of the domain (S108).

The controller 14d determines whether the identified security level is Authenticated user (S109). If the security level is Authenticated user, the record regarding the domain is updated (S110). If the security level is not Authenticated user, that is, if the domain authentication level is Unauthenticated, the record regarding the domain is deleted (S111).

FIG. 9 illustrates an example of the tenant user management table 14e1 updated in the process in FIGS. 8A and 8B. The records regarding the users u1, u2, and u3 originally belonging to the tenant A 10 are kept as before, but the records regarding the users u4, u5, and u6 previously belonging to the tenant B 12 as the unification target are updated. Specifically, Tenant-B as a tenant ID for the users u4, u5, and u6 is updated with Tenant-A, and the security levels are also updated. The security level of the user u4 is still Authenticated user. Authenticated user as the security level of the user u5 is updated with Guest, and the authentication domain is updated with Nil. Although the user u5 has a use right as Authenticated user in the pre-unification tenant B 12, the user u5 no longer has the use right as Authenticated user after the unification and uses the device after undergoing stricter authentication than before for using the device as a guest. The case of the stricter authentication may include a case where the user u5 is not allowed to use a device allowed to be used by only an authenticated user. The security level of the user u6 is kept as Guest.

FIG. 10 illustrates an example of the domain management table 14e2 updated in the process in FIGS. 8A and 8B. Tenant-B as a tenant ID for the authentication domain ccc.fujixerox.co.jp is updated with Tenant-A. The authentication domain ddd.fujixerox.co.jp is not present in the records regarding Tenant-A after the unification as illustrated in FIG. 9, and thus the record regarding the domain is deleted. In FIGS. 10, 18, 23, crossed out records represent deleted and thus absent records.

Figure 11:
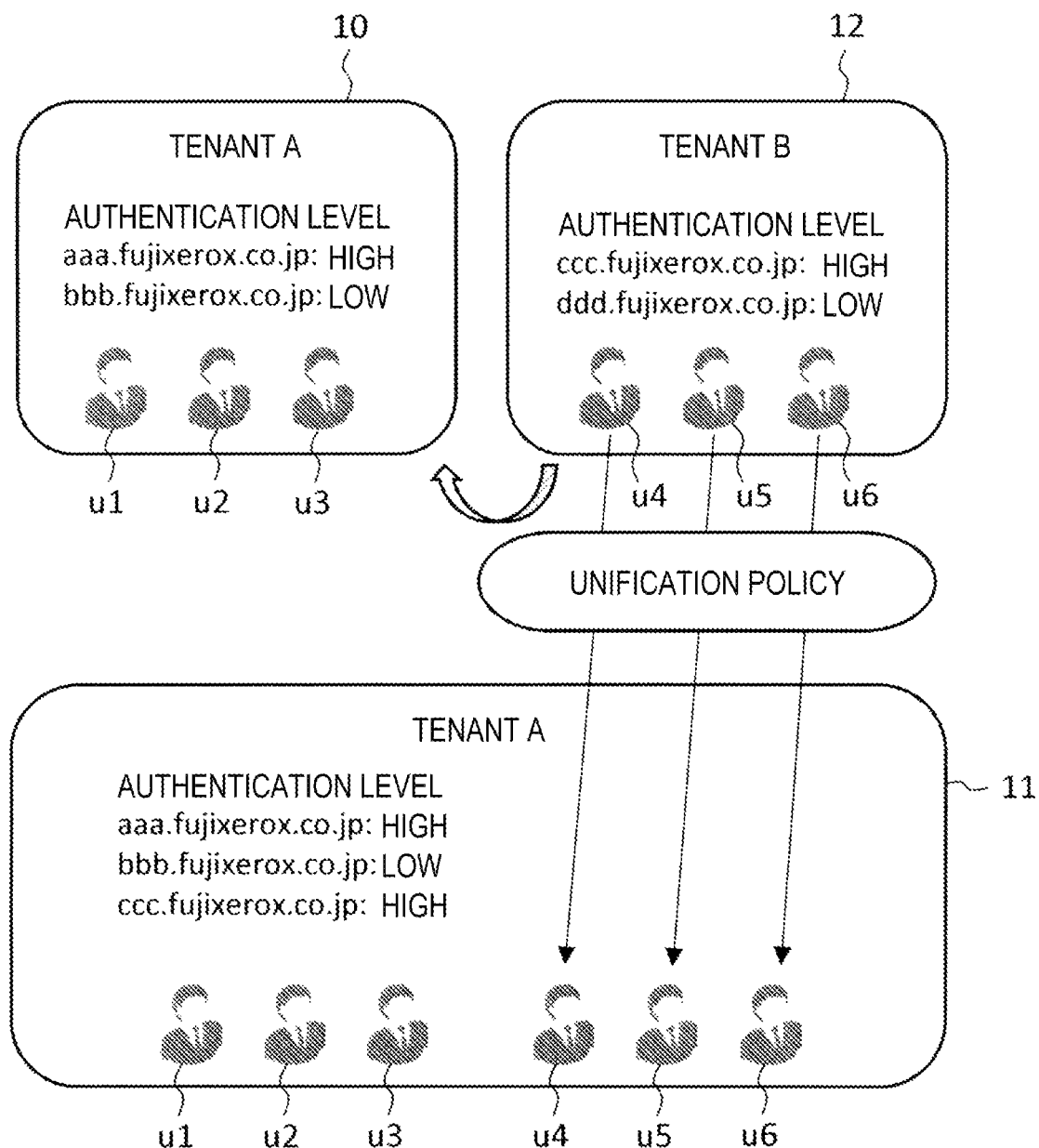
FIG. 11 is a schematic diagram of a unification process in the exemplary embodiment.

FIG. 11 schematically illustrates the unification process using the unification policy in this exemplary embodiment. In the case where the user u4, the user u5, and the user u6 belonging to the tenant B 12 as the unification target are moved into the post-unification tenant A 11, the unification policy specifying the unification rule is referred to for the moving, and thereby the security levels of the users u4, u5, and u6 are set. Each post-unification security level is determined depending on the authentication level of the domain to which the corresponding user in the pre-unification tenant B 12 belongs (see FIG. 7). Each authentication domain in the post-unification tenant A 11 is also determined in accordance with the unification policy. Specifically, the authentication domain ddd.fujixerox.co.jp having been present in the pre-unification tenant B 12 is not present as Authentication domain in the post-unification tenant A 11 because any user belonging to the domain is not present.

Although the unification policy table 14e3 as illustrated in FIG. 7 is used in this exemplary embodiment, an administrator who manages the post-unification tenant A 11 may optionally input and set the unification policy.

FIG. 12 illustrates an example of a different unification policy table 14e3. The unification policy table 14e3 specifies a relationship between the pre-unification authentication level of a domain to which a user belongs and the post-unification security level of the user.
Specifically,
High as Domain authentication level leads to Authenticated user,
Low as Domain authentication level leads to Authenticated user, and
Unauthenticated as Domain authentication level leads to Guest.
The unification policy table 14e3 is effective in a case where a user belonging to the tenant B 12 is assigned a right equal to the right of a user belonging to the tenant A 10 when the tenant A 10 and the tenant B 12 are unified into one on an equal basis and other cases.

FIG. 13 illustrates an example of a different unification policy table 14e3. The unification policy table 14e3 specifies a relationship between the pre-unification authentication level of a domain to which a user belongs and the post-unification security level of the user.
Specifically,
High as Domain authentication level leads to Guest,
Low as Domain authentication level leads to Guest, and
Unauthenticated as Domain authentication level leads to Guest.
The unification policy table 14e3 is effective in a case where the rights of the users belonging to the tenant B 12 are limited in the unification performed in such a manner that the tenant A 10 absorbs the tenant B 12 and other cases.

The security level of each user belonging to the unification target tenant is set in this exemplary embodiment, and whether to grant or deny a license to use a service may also be set in addition to the security level. In this case, the controller 14d functions as the security level setting unit and also as a license setting unit.

FIG. 14 illustrates an example of a different tenant user management table 14e1. In FIG. 3, the user ID, the security level, and the authentication domain are registered in the tenant user management table 14e1. In the different tenant user management table 14e1, a service ID is further registered in association with the user ID. Specifically, a service A is provided in the tenant A 10, and a service B is provided in the tenant B 12. The user u1 and the user u2 are allowed to use the service A, and the user u4 and the user u5 are allowed to use the service B.

FIG. 15 illustrates an example of a service management table 14e4 additionally stored in the memory 14e of the management server 14. The service management table 14e4 manages the number of licenses (the upper limit) and the number of assigned licenses for the services on a per tenant basis. For example, the number of licenses for the service A provided in the tenant A 10 is 100, and the number of assigned licenses is 2. The number of licenses for the service B provided in the tenant B 12 is 100, and the number of assigned licenses is 2. The reason why the number of assigned licenses for the service A is 2 is that the license is assigned to the user u1 and the user u2. The reason why the number of assigned licenses for the service B is 2 is that the license is assigned to the user u4 and the user u5.

FIG. 16 illustrates an example of a different unification policy table 14e3. The unification policy table 14e3 specifies the post-unification security level of each user and whether or not to assign the license for the corresponding service.

Attention being focused on the users belonging to the pre-unification tenant B 12, the license for the service A provided in only the tenant A 10 is not assigned to the users belonging to the tenant B 12 also after the unification. The not assigning of the license does not depend on the security levels of the users belonging to the tenant B 12. That is, regardless of whether the security level is Authenticated user or Guest, the license for the service A is not assigned to the users belonging to the pre-unification tenant B 12. Note that the original operation for the service A is kept as before, and thus whether or not to assign the license is not specified for the users belonging to the tenant A 10 in the unification policy table 14e3.

In contrast, regarding the service B provided in the tenant B 12, the service B is provided also in the post-unification tenant A 11, but whether or not to assign the license depends on the user. Specifically, among the users previously belonging to the pre-unification tenant A 10, an authenticated user is assigned the license for the service B, and a guest is not assigned the license for the service B. Among the users previously belonging to the pre-unification tenant B 12, an authenticated user is assigned the license for the service B, and a guest is not assigned the license for the service B. In summary, whether or not to assign the license for the service B is set in accordance with the post-unification security level, regardless of the pre-unification tenant.

Figure 17:
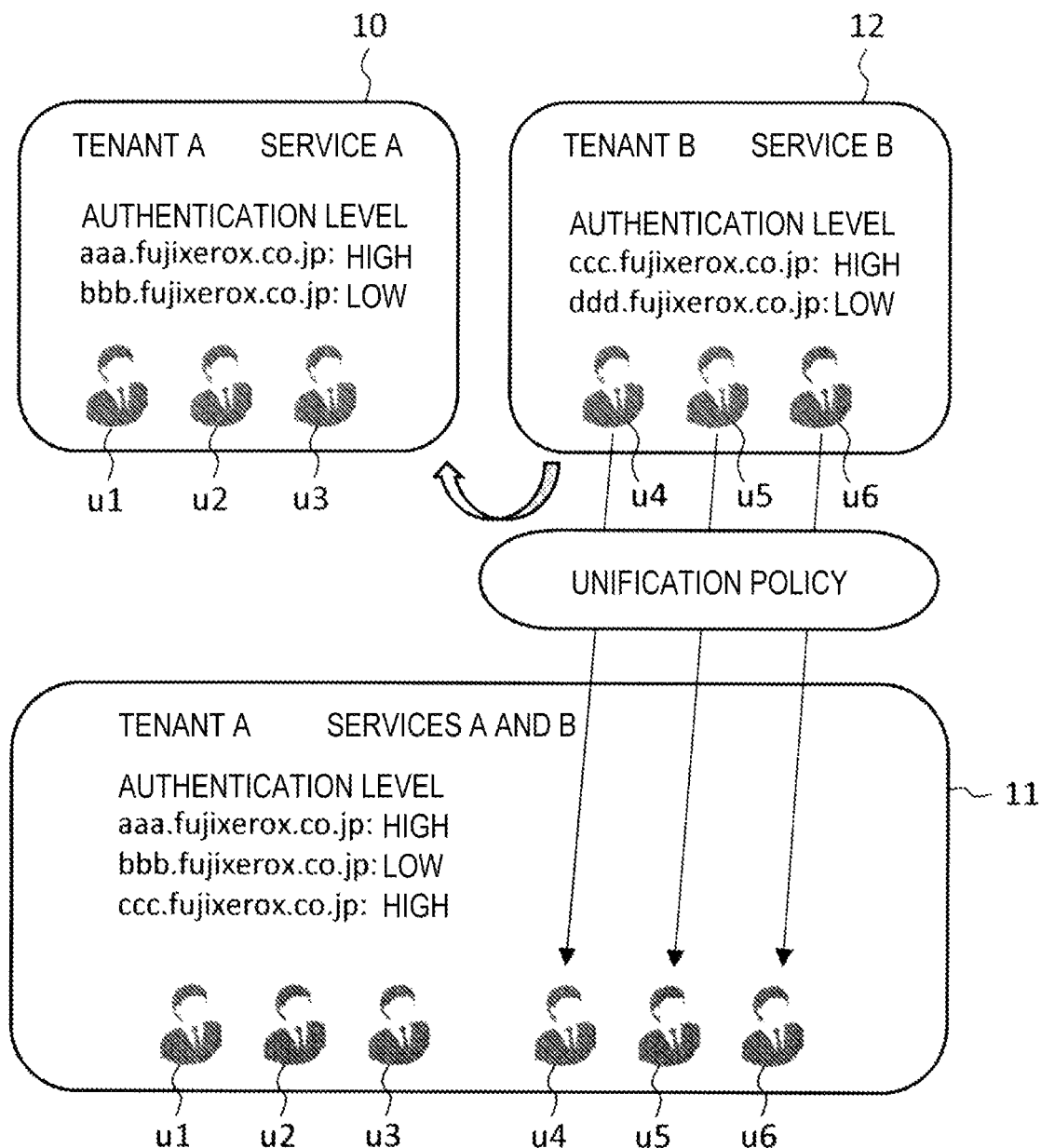
FIG. 17 is a schematic diagram of a different unification process in the exemplary embodiment.

FIG. 17 schematically illustrates a service licensing process involved with the unification process using the unification policy. In the case where the user u4, the user u5, and the user u6 belonging to the tenant B 12 as the unification target are moved into the post-unification tenant A 11, the unification policy specifying the unification rule is referred to for the moving, and thereby the security levels of the users u4, u5, and u6 and whether or not to assign the license for the service B to the users u1 to u6 are set.

Regarding the service A, the license is not assigned to the user u4, the user u5, and the user u6 belonging to the tenant B 12 as the unification target.

Regarding the service B, whether or not to assign the license is determined in accordance with the post-unification security level. Accordingly, the user u1 and the user u2 rated as Authenticated user for the post-unification security level are assigned the license for the service B, and the user u3 rated as Guest is not assigned the license. The user u4, the user u5, and the user u6 rated as Guest for the post-unification security level (see FIG. 13) are not assigned the license for the service B.

FIG. 18 illustrates the updated tenant user management table 14e1 after the unification. The records having Tenant-B as a tenant ID and Service-B as a service ID are deleted, and records having Tenant-A as a tenant ID and Service-B as a service ID are newly added. The IDs of the user u1 and the user u2 are registered as user IDs for the service B.

FIG. 19 illustrates the updated service management table 14e4 after the unification. Tenant-B as a tenant ID is updated with Tenant-A. Since the license for the service B is assigned to only the user u1 and the user u2, the number of assigned licenses is still 2. If the user u4 is assigned the license, the number of assigned licenses for the service B is updated with 3.

If tenants have respective administrators, and when security levels and whether to grant or deny the license for a service are set in unifying the tenants into one, an administrator right may be set in the unification process. In this case, the controller 14d functions as a right setting unit as well as the security level setting unit and the license setting unit.

FIG. 20 illustrates an example of the tenant user management table 14e1 with the administrator right assigned to users. For the service B provided for Tenant-B, the user u4 and the user u5 have the administrator right, and the user u6 is a general user (does not have the administrator right).

FIG. 21 illustrates an example of the service management table 14e4 in this case. The number of licenses (upper limit) for the service B is 100, the number of assigned licenses is 3 because the user u4, the user u5, and the user u6 are assigned the license.

FIG. 22 illustrates an example of the unification policy table 14e3 in this case. For the service B after the unification, whether or not to assign the license and whether or not to assign the administrator right are determined in accordance with the pre-unification security level. Specifically, Authenticated user previously associated with Tenant-A is assigned the license and the administrator right. Guest previously associated with Tenant-A is not assigned the license and is naturally not assigned the administrator right, either. Authenticated user previously associated with Tenant-B is assigned the license but is not assigned the administrator right as being rated as a general user. Guest previously associated with Tenant-B is not assigned the license and naturally is not assigned the administrator right, either.

FIG. 23 illustrates the updated tenant user management table 14e1 after the unification. The user u4 and the user u5 associated with pre-unification Tenant-B have had the administrator right for the service B. However, after the unification, the user u4 and the user u5 do not have the administrator right and are rated as the general user. The user u6 is not assigned the license for the service B and thus is deleted. The user u1 and the user u2 associated with pre-unification Tenant-A are assigned the license for the service B and the administrator right.

FIG. 24 illustrates the updated service management table 14e4 after the unification. The number of assigned licenses for the service B is updated with 4. This is because the user u4 and the user u5 still have the license (but do not have the administrator right), the user u6 is not assigned the license, and the user u1 and the user u2 are newly assigned the license.

The exemplary embodiment of the present disclosure has heretofore been described. However, the disclosure is not limited to the exemplary embodiment, and various modifications may be made thereto. Hereinafter, modifications will be described.

Modification 1

In the exemplary embodiment, as illustrated by the unification policy table 14e3 in FIG. 7, the security level of a user in the post-unification tenant is set in accordance with the domain authentication level for the user. However, the security level may be set on the basis of how frequently the user uses a service in addition to the domain authentication level.

Examples of the above include the following case and the like. A service use frequency counted on a per user basis is registered in the tenant user management table 14e1 illustrated in FIG. 3. For example, if a service use frequency is relatively high, the security level is raised. This enables the security level to be set in accordance with the domain authentication level and the service use frequency. Even though the domain authentication level is relatively low, a user with a relatively high use frequency is set as Authenticated user. A user with a relatively low domain authentication level and a relatively low use frequency is set as Guest.

FIG. 25 illustrates an example of the unification policy table 14e3 in this case. The post-unification security level is set by using a matrix having the domain authentication level and the use frequency. If Domain authentication level is High, the security level is set as Authenticated user regardless of whether the use frequency is high or low. If Domain authentication level is Unauthenticated, the security level is set as Guest regardless of the use frequency. If Domain authentication level is Low, the security level is set as Authenticated user or Guest depending on the use frequency.

Modification 2

In the exemplary embodiment, as illustrated by the unification policy table 14e3 in FIG. 16, even though a user previously belonging to the tenant B 12 is an authenticated user, the user is not assigned the license for the service A. However, regardless of the pre-unification tenant, the license may be assigned to an authenticated user, and may not be assigned to a guest user.

Likewise, regardless of the pre-unification tenant, the administrator right may be assigned, as before, to a user who has been an authenticated user and had the administrator right.

Modification 3

In the exemplary embodiment, the case where the tenant A 10 and the tenant B 12 are unified into one has heretofore been described. However, the number of tenants to be unified is not limited. A case where three or more tenants are unified into one is also applicable.

If a tenant is divided into two or more tenants, a division policy table that specifies a division policy, instead of the unification policy table 14e3, may be input from the input unit 14b and stored in the memory 14e. On the basis of the authentication level of a domain and the division policy table, a security level may be set for each of users belonging to the tenants after the division.

Modification 4

In the exemplary embodiment, the unification policy is input from the input unit 14b and is stored as the unification policy table 14e3 in the memory 14e. The unification policy may be provided, via the network 16, to the management server 14 from an administrator terminal connected to the network 16. In this case, the communication I/F 14a that receives the unification policy from the administrator terminal may function as the unification policy setting unit. The unification policy table 14e3 may also be stored in a server different from the management server 14. In the case where the tenant A 10 and the tenant B 12 are unified into one, the controller 14d may refer to the unification policy table 14e3 stored in the different server via the network 16 and thereby may set the security levels and the like. That is, the management server 14 does not have to be a single server and may be composed of multiple servers.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A management apparatus comprising:
a memory device that stores, for each of a user belonging to a first group and a user belonging to a second group, an authentication level of a domain assigned to a corresponding one of the user belonging to the first group and the user belonging to the second group;
a hardware processor electrically connected to the memory device and configured to:
set a unification policy that specifies a relationship between the authentication level and a security level for a state after unification by using an input device or a communication interface (I/F);
set the security level in a case where the first group and the second group undergo the unification into a third group, the security level being set for each of the users belonging to the third group by using the authentication level and the unification policy; and
assign a service use license to each of the users in the third group by using the set unification policy so as to implement the security level set for each of the users belonging to the third group.

2. The management apparatus according to claim 1, wherein the hardware processor is further configured to set, for each of the users in the third group by using the unification policy, whether or not to assign the service use license.

3. The management apparatus according to claim 1, wherein the hardware processor is further configured to set, for each of the users in the third group by using the unification policy, whether or not to assign an administrator right for a service.

4. The management apparatus according to claim 2, wherein the hardware processor is further configured to set, for each of the users in the third group by using the unification policy, whether or not to assign an administrator right for a service.

5. The management apparatus according to claim 1, wherein the memory device stores a use frequency on a per user basis, and
wherein the hardware processor is further configured to set the security level for each of the users belonging to the third group by using the authentication level, the unification policy, and the use frequency.

6. The management apparatus according to claim 1,
wherein the authentication level includes a first authenticated level, a second authenticated level lower than the first authenticated level, and an unauthenticated level, and
wherein the hardware processor is further configured to set an authenticated user level for a user with the first authenticated level and set a guest user level for a user with the second authenticated level and a user with the unauthenticated level.

7. The management apparatus according to claim 1,
wherein the authentication level includes a first authenticated level, a second authenticated level lower than the first authenticated level, and an unauthenticated level, and
wherein the hardware processor is further configured to set an authenticated user level for a user with the first authenticated level and a user with the second authenticated level and set a guest user level for a user with the unauthenticated level.

8. The management apparatus according to claim 1,
wherein the authentication level includes a first authenticated level, a second authenticated level lower than the first authenticated level, and an unauthenticated level, and
wherein in a case where the second group undergoes the unification by absorption by the first group, the hardware processor is further configured to set the guest user level for the user in the second group regardless of the authentication level.

9. The management apparatus according to claim 2,
wherein the authentication level includes a first authenticated level, a second authenticated level lower than the first authenticated level, and an unauthenticated level, and
wherein the hardware processor assigns the service use license to a user with the first authenticated level and does not assign the service use license to a user with the second authenticated level and a user with the unauthenticated level.

10. The management apparatus according to claim 2,
wherein the authentication level includes a first authenticated level, a second authenticated level lower than the first authenticated level, and an unauthenticated level, and
wherein in a case where the second group undergoes the unification by absorption by the first group, the hardware processor does not assign the service use license to the user in the second group regardless of the authentication level.

11. The management apparatus according to claim 3,
wherein regardless of the authentication level, the hardware processor assigns the administrator right, as before, to a user who has the administrator right before the unification.

12. The management apparatus according to claim 4,
wherein regardless of the authentication level, the hardware processor assigns the administrator right, as before, to a user who has the administrator right before the unification.

13. The management apparatus according to claim 3,
wherein in a case where the second group undergoes the unification by absorption by the first group, the hardware processor does not assign the administrator right to the user in the second group regardless of the authentication level.

14. The management apparatus according to claim 4,
wherein in a case where the second group undergoes the unification by absorption by the first group, the hardware processor does not assign the administrator right to the user in the second group regardless of the authentication level.

15. A non-transitory computer readable medium storing a program causing a computer to execute a process comprising:
storing, for each of a user belonging to a first group and a user belonging to a second group, an authentication level of a domain assigned to a corresponding one of the user belonging to the first group and the user belonging to the second group;
setting a unification policy that specifies a relationship between the authentication level and a security level for a state after unification;
setting the security level in a case where the first group and the second group undergo the unification into a third group, the security level being set for each of the users belonging to the third group by using the authentication level and the unification policy; and
assigning a service use license to each of the users in the third group by using the set unification policy so as to implement the security level set for each of the users belonging to the third group.

16. A management apparatus comprising:
means for storing, for each of a user belonging to a first group and a user belonging to a second group, an authentication level of a domain assigned to a corresponding one of the user belonging to the first group and the user belonging to the second group;
means for setting a unification policy that specifies a relationship between the authentication level and a security level for a state after unification;
means for setting the security level in a case where the first group and the second group undergo the unification into a third group, the security level being set for each of the users belonging to the third group by using the authentication level and the unification policy; and
means for assigning a service use license to each of the users in the third group by using the set unification policy so as to implement the security level set for each of the users belonging to the third group.

* * * * *